V. NOTARESCHI.
CONNECTING ROD.
APPLICATION FILED JULY 28, 1920.
1,359,269.
Patented Nov. 16, 1920.
Fig. 1.
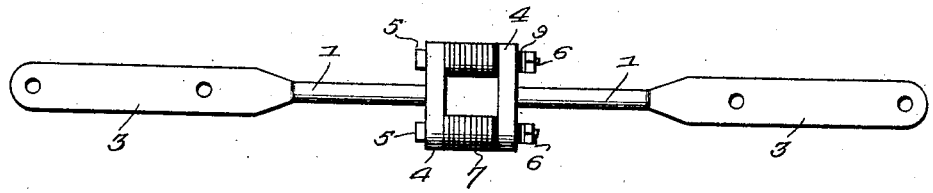
Fig. 2.
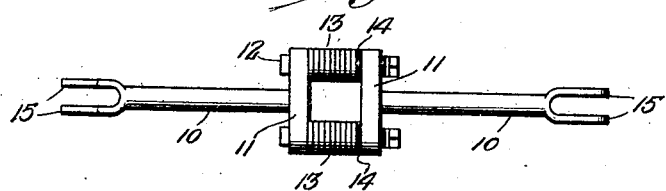
Fig. 5.
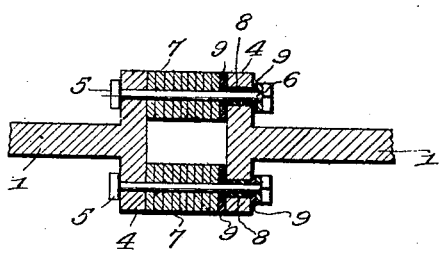
Fig. 4.
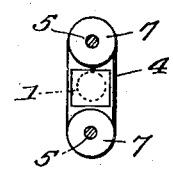
Fig. 3.
WITNESSES
J. H. Crawford
C. E. Trainor
INVENTOR
Valentine Notareschi,
BY
ATTORNEYS

UNITED STATES PATENT OFFICE.

VALENTINE NOTARESCHI, OF STRUTHERS, OHIO.

CONNECTING-ROD.

1,359,269.   Specification of Letters Patent.   Patented Nov. 16, 1920.

Application filed July 28, 1920. Serial No. 399,524.

*To all whom it may concern:*

Be it known that I, VALENTINE NOTARESCHI, a citizen of the United States, and a resident of Struthers, in the county of Mahoning and State of Ohio, have invented certain new and useful Improvements in Connecting-Rods, of which the following is a specification.

My invention is an improvement in connecting rods, and has for its object to provide a rod of the character specified especially adapted for use with railroad switches and the like, wherein the length of the rod must be varied to suit conditions, and wherein the rod is a continuous rigid structure from end to end.

In the drawings:—

Figure 1 is a plan view of one embodiment of the invention,

Fig. 2 is a plan view of another embodiment,

Fig. 3 is an end view of one of the sections,

Fig. 4 is a horizontal section at the connection between the sections,

Fig. 5 is a side view of one of the sections shown in Fig. 2.

In the embodiment of the invention shown in Figs. 1, 3 and 4 the improved rod is composed of similar sections 1, each of which is provided at one end with a pair of vertically spaced straps 3 for lapping upon the opposite faces of a connecting plate or the like, and at the other end with a cross head 4.

The straps 3 are spaced apart from each other laterally and they have registering openings for receiving the bolts to connect them to the connecting plate or other member to which they are connected. The cross heads 4 of the section 1 of the rod have registering openings, for receiving the bolts 5, and these bolts are engaged by nuts 6 to connect the parts together.

In order to properly space the cross head a series of washers 7 of metal is arranged upon the bolts 5, and it will be evident that by varying the number of washers the distance that the cross heads 4 are spaced apart from each other may be varied and as a consequence the aggregate length of the connecting rod.

When it is desired to insulate the two sections from each other, bushings 8 are arranged between the bolts and the cross head, and two washers 9 of insulated material are arranged on each bolt adjacent to one cross head, the washers being on opposite sides of the cross head. The bushings 8 are long enough to space the bolts away from the cross head, and the insulated washers are of the same size as the metal washers 7 at the face of the cross head, and at the outer side of the cross head a metal washer is arranged, and the said washer and the adjacent washer 9 are of the same diameter as the nut 6. Insulation is thus provided between the two sections of the connecting rod. When it is desired to vary the length of the rod this may be done by disconnecting one of the sections and removing washers 7 or adding washers until the required length is obtained. If necessary, the washers may be made of varying thickness.

In Fig. 2 there is shown a rod more especially adapted as a plan connecting rod. In this arrangement the sections 10 of the rod have the cross heads 11 which are connected by the bolts 12, the washers 13 and 14 being arranged on the bolts in the same manner as shown in Figs. 1 and 4, the washers 14 being insulated washers. At their outer ends the rod sections 10 have spaced lugs 15 for receiving the elements to be connected between them, and these lugs may be perforated, as shown in Fig. 5, to receive the connecting bolt.

I claim:—

1. A connecting rod comprising similar sections, each having at the end adjacent to the other section a cross head, said cross heads having registering openings at their ends, bolts passing through the openings, washers arranged upon the bolts, and nuts engaging the bolts to connect the sections, insulated bushings between the bolts and one head, an insulating washer between the same head and the washers, and another between the said head and the nut.

2. A connecting rod comprising similar sections, each having at the end adjacent to the other section a cross head, said cross heads having registering openings at their ends, bolts passing through the openings, washers arranged upon the bolts, and nuts engaging the bolts to connect the sections.

3. A rod of the character specified, consisting of sections each having a cross head at the end adjacent to the other section, bolts connecting the adjacent ends of the two cross heads, and washers on each bolt.

VALENTINE NOTARESCHI.